United States Patent
Hurd, II et al.

(10) Patent No.: US 6,266,806 B1
(45) Date of Patent: Jul. 24, 2001

(54) OBJECT ORIENTED MONITOR DISPLAYING INTERACTIONS AMONG OBJECTS IN SQUARE MATRIX WITH AN OBJECT DESIGNATED IN FIRST COLUMN AND ADDITIONAL COLUMN(S) FOR INTERACTING OBJECTS

(75) Inventors: Donald M. Hurd, II, Allen; Richard S. Weldon, Jr., Plano; Lance D. Jacobs, Dallas, all of TX (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/177,545

(22) Filed: Oct. 22, 1998

(51) Int. Cl.$^7$ .................................................. G06F 9/44
(52) U.S. Cl. ................................................................ 717/4
(58) Field of Search .............................. 717/4; 345/339, 345/346, 356; 709/313, 315

(56) References Cited

U.S. PATENT DOCUMENTS

| | | | |
|---|---|---|---|
| 5,590,277 | * 12/1996 | Fuchs et al. | 717/4 |
| 5,740,440 | * 4/1998 | West | 717/4 |
| 5,960,199 | * 9/1999 | Brodsky et al. | 717/4 |
| 5,983,016 | * 11/1999 | Brodsky et al. | 717/4 |
| 5,991,536 | * 11/1999 | Brodsky et al. | 717/4 |
| 6,058,393 | * 5/2000 | Meier et al. | 717/4 |
| 6,081,665 | * 6/2000 | Nilsen et al. | 717/4 |
| 6,083,281 | * 7/2000 | Diec et al. | 717/4 |

FOREIGN PATENT DOCUMENTS

WO 96/11629  4/1996  (WO).

OTHER PUBLICATIONS

Forte Announces General Availibility of the Advanced Forte Application Development Environment, Business Wire, Rich Scheffer, Sep. 1994.*

"Examing Forte Express", Nabil Hijazi, Dr. Dobbs Journal v21 n11 p. 86, Nov. 1996.*

(List continued on next page.)

*Primary Examiner*—Mark R. Powell
*Assistant Examiner*—Todd Ingberg
(74) *Attorney, Agent, or Firm*—Baker Botts L.L.P.

(57) ABSTRACT

A method and system for summarizing object interactions in an object-oriented software program is disclosed. A plurality of tabular inputs containing information about the object interactions in a software system are input into a computer system. The system then determines object information and interaction information from the input information and generates an object summary from the object information and interaction information. The object summary may comprise an object summary matrix indicating instances of interaction between the objects of the software program and a plurality of message summaries that indicate messages sent from and sent to a particular object of the software program.

16 Claims, 6 Drawing Sheets

| From/To | /Mi | Main Fabric Mgr | Main Tsp Mi | Main Hse Mi | UcHse Mi ProvDB | Uc Fabric Mgr | Uc Tsp Mi | Uc Hse Mi | /Device Interface Point (TSP MI) | /Device Interface Point (HSE MI) |
|---|---|---|---|---|---|---|---|---|---|---|
| /Mi | | * | | | | | | | | |
| MainFabricMgr | | | * | * | | | | | | |
| MainTspMi | | | | * | | * | | | | |
| MainHseMi | | | * | | * | * | | | | |
| UcHseMiProvDB | | | | | | | | | | |
| UcFabricMgr | | | | | | | | * | | |
| UcTspMi | | | | | | | | | | |
| UcHseMi | * | | | | | | | | * | * |
| /DeviceInterfacePoint (TSP MI) | | | | | | | | | | |
| /DeviceInterfacePoint (HSE MI) | | | | | | | | | | |

OTHER PUBLICATIONS

"Forte Express Development Route", Debrorah Schwartz, HP Professional v10, n6 p14, Jun. 1996.*

"Four DTP Monitors Build Enterprise App Services", by A. Frey, www.networkcomputing.com, Oct. 24, 1997.*

"BEA Jolt Whitepaper", www.beasys.com/products/jolt/papers.html, May 23, 1997.*

"Beating Big Blue at Its Old Game?" by Debra O'Donnell www.bea.com/press/news_IBM.html, Apr. 1997.*

"Enterprise Management with BEA Manager" www.beasys.com/products/manager/paper_enterprise_mgmt.html, Apr. 1999.*

"A Grand Opening For Virtual Storefronts with Middleware", www.networkcomputing.com/810/810rl.html, May 23, 1997.*

"Essential Guide to Object Monitor", K. Boucher et al Table of Content, Covers and Foreword, Mar. 1999.*

"How Debuggers Work Algorithms, Data Structures and Architecture" J. Rosenberg Chapter 10 Debugging GUI Applications, 1996.*

"Next–Generation TP Monitors: Are You Ready?", Nick Gall Network Computing, www.networkcomputing.com/816/816colgall.html, Aug. 23, 1997.*

"State of Middle Ware Standards" Network Computing www.networkcomputing.com/811/811f2chart.html, Jun. 6, 1997.*

Hitachi TP Broker User's Guide Release 3.1 Inprise Corporation, Sep. 28, 1998.*

"Template Software Strengthens Core Product Family with Ease–of–Use and Functional Enhancements That Promote Unparalled Software Reuse", PR Newswire, Jun. 23, 1997.*

Workflow Template Process Template Developing a WFT Worthflow System Template Software WFT Version 8.0 Second Edition, 1998.*

Forte System Management Guide Release 3 Chapter 7, Appendix C, 1997.*

* cited by examiner

FIG. 3A

| TITLE | Adjust Servo | | space line |
|---|---|---|---|
| NOTE | The servo adjustment is performed as a result of a slave MI(e.g., HSE MI) being restored with the adjustServo argument set to true. | | |
| CLASS | /Mi | | |
| CLASS | MainFabric/Mgr | | |
| CLASS | MainTspMi | | |
| CLASS | MainHseMi | | |
| CLASS | UcHseMi/ProvDB | | |
| CLASS | UcFabricMgr | | |
| CLASS | UcTspMi | | |
| CLASS | UcHseMI | | |
| CLASS | /DeviceInterface\Point\(TSP MI) | | |
| CLASS | /DeviceInterface\Point\(HSE MI) | | |
| MSG | FROM | /Mi | TO | MainFabricMgr |
| postTransaction(restore,\deviceEID,\ adjustServo=true) | | | |
| restore(adjustServo) | MainFabricMgr | | MainHseMi |
| COMMENT | FROM | | TO |
| Note: normal restore occurs before servo adjustment. \refer to previous event trace. | MainHseMi | | UcTspMi |
| MSG | FROM | | TO |
| adjustServo | MainHseMi | | MainTspMi |

| | | |
|---|---|---|
| slaveServoSetup | MainTspMi | MainHseMi |
| postTransaction(slaveServoSetup,deviceEID) | MainHseMi | UcFabricMgr |
| slaveServoSetup | UcFabricMgr | UcHseMi |
| write(resetio112) | UcHseMi | /DeviceInterfacePoint(HSE_MI) |
| write(initio112status) | UcHseMi | /DeviceInterfacePoint(HSE_MI) |
| read(signalOffset) | UsHseMi | /DeviceInterfacePoint(HSE_MI) |
| postTransaction(slaveServoSetup, currentSignalOffset) | UsHseMi | MainFabricMgr |
| slaveServoSetup(currentSignalOffset) | MainFabricMgr | MainHseMi |
| slaveServoSetup(currentSignalOffset) | MainHseMi | MainTspMi |
| postTransaction(MasterServoSetup, deviceEid) | MainTspMi | UcFabricMgr |
| masterServoSetup | UcFabricMgr | UcHseMi |
| write(resetio112) | UcHseMi | /DeviceInterfacePoint(TSP_MI) |
| write(initioI12Status) | UcHseMi | /DeviceInterfacePoint(TSP_MI) |
| read(signalOffset) | UcHseMi | /DeviceInterfacePoint(TSP_MI) |
| postTransaction(masterServoSetup, currentSignalOffset) | UcHseMi | MainFabricMgr |
| masterServoSetup(currentSignalOffset) | MainFabricMgr | MainTspMi |
| setSignalOffset(newSignalOffset) | MainTspMi | MainHseMi |
| setSignalOffset(newSignalOffset) | MainHseMi | UcHseMiProvDB |
| postTransaction(setSignalOffset, deviceEid,newSignalOffset) | MainHseMi | UcFabricMgr |
| setSignalOffset(newSignalOffset) | UcFabricMgr | UcHseMi |
| write(newSignalOffset) | UcHseMi | /DeviceInterfacePoint(HSE_MI) |

FIG. 5A

```
502 { CLASS  / Mi
      to     MainFabricMgr    — postTransaction (restore,deviceEid, adjustServo=true)

CLASS  MainFabricMgr
      from   /Mi              — postTransaction (restore,deviceEid, adjustServo=true)
      to     MainHseMi        — restore(adjustServo
      from   UcHseMi          — postTransaction (slaveServoSetup,
                                  currentsignalOffset)
502 { to     MainHseMi        — slaveServosetup (currentSignalOffset)
      from   UsHseMi          — | postTransaction (masterServoSetup,
                                  currentSignalOffset)
      to     MainTspMi        — masterServoSetup (current SignalOffset)

CLASS  mainTspMi
      from   MainHseMi        — adjustServo }Note:  Normal restore
                                 occurs before servo adjustment. refer to previous
                                 event trace.}
                              — slaveServoSetup
502 { to     MainHseMi        — slaveServoSetup  (currentSignalOffset)
      from   MainHseMi        — postTransaction (MasterServoSetup, device Eid)
      to     UcFabricMgr      — master ServoSetup (currentSignalOffset)
      from   MainFabricMgr    — setSignalOffset (newSignalOffset)
      to     MainHseMi 504a → CLASS  MainHseMi
      from   MainFabricMgr    — restore (adjustServo)
      to     MainTspMi        — adjustServo }Note: normal restore occurs before servo
                                 adjustment.refer to previous event trace.}
                              — slaveServoSetup
      from   MainTspMi        — postTransaction (slaveServoSetup, deviceEid)
504b { to     UcFabricMgr      — slaveServoSetup  (currentSignalOffset}
504 {  from   MainFabricMgr    — slaveServoSetup  (currentSignalOffset)
      to     MainTspMi        — setSignalOffset  (newSignalOffset}
      from   MainTspMi        — setSignalOffset  (newSignalOffset}
      to     UcHseMiProvDB
      to     UcFabricMgr      — postTransaction (setSignalOffset, deviceEid, newSignal, Offset)
```

```
CLASS  UcHseMiProvDB
from   MainHseMi                              |  setSignalOffset (newSignalOffset)

CLASS  UcFabricMgr
from   MainHseMi                              |  postTransaction(slaveServoSetup, deviceEid)
to     UcHseMi                                |  slaveServoSetup
from   MainTspMi                              |  postTransaction (MasterServoSetup, deviceEid)
to     UcHseMi                                |  masterServoSetup
from   MainHseMi                              |  postTransaction (setSignalOffset, deviceEid,
                                                   newSignalOffset)
to     UcHseMi                                |  setSignalOffset (newSignalOffset)

CLASS  UcTspMi
CLASS  UcHseMi
from   UcFabricMgr                            |  slaveServosetup
to     /DeviceInterfacePoint(HSE MI)          |  write (resetio112)
to     /DeviceInterfacePoint(HSE MI)          |  write (initio112Status)
to     /DeviceInterfacePoint(HSE MI)          |  read  (signalOffset)
from   MainFabricMgr                          |  postTransaction (slaveServoSetup, currentSignalOffset)
from   UcFabricMgr                            |  masterServoSetup
to     /DeviceInterfacePoint (TSP MI)         |  write (resetio112)
to     /DeviceInterfacePoint (TSP MI)         |  write (initio112Status)
to     /DeviceInterfacePoint (TSP MI)         |  read  (signalOffset)
from   MainFabricMgr                          |  postTransaction (masterServoSetup, currentSignalOffset)
from   UcFabricMgr                            |  setSignalOffset(newSignalOffset)
to     /DeviceInterfacePoint (HSE MI)         |  write (newSignalOffset)

CLASS  /DeviceInterfacePoint (TSP MI)
from   UcHseMi                                |  write (resetio112)
from   UcHseMi                                |  write (initio112Status)
from   UcHseMi                                |  read  (signalOffset)

CLASS  /DeviceInterfacePoint (HSE MI)
from   UcHseMi                                |  write (resetio112)
from   UcHseMi                                |  write (initio112Status)
from   UcHseMi                                |  read  (signalOffset)
from   UcHseMi                                |  write (newSignalOffset)
```

FIG. 5B

OBJECT ORIENTED MONITOR DISPLAYING INTERACTIONS AMONG OBJECTS IN SQUARE MATRIX WITH AN OBJECT DESIGNATED IN FIRST COLUMN AND ADDITIONAL COLUMN(S) FOR INTERACTING OBJECTS

NOTICE

"Copyright 1997 DSC Corporation." A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatever.

TECHNICAL FIELD OF THE INVENTION

This invention relates to the field of computer systems. More specifically, this invention relates to a system and method for summarizing object interactions in a software program.

BACKGROUND OF THE INVENTION

Computer systems in general are well known. A typical system comprises a computer, keyboard, mouse, and a monitor. Further, the computer might comprise a CPU, and RAM and allows various software programs to be used. Software programs are well known and will not be described in detail. Briefly, a software program allows a computer to be customized to perform functions and services that a user demands. Software programs are created using various programming tools which might include, a programming language, editors, debuggers, and other tools to assist the programmer. Software has become so advanced, that programmers use a visual representation of their program to help them develop and finalize the software. This is especially true with object-oriented programming.

Object-oriented programs utilize multiple objects. An object is a "black box" that receives and sends messages and is generally capable of performing a specific task. Programming in an object-oriented language involves sending messages to and from various objects. The objects use these messages as inputs to perform their specific task. The specific tasks are strung together in order to accomplish the desired function of the software program. In general, the programmer is not concerned with how the object works, but rather is only concerned with what the object does.

Development of complex software programs is typically shared among a number of groups with each group taking responsibility for a subsystem of the overall software program according to a predetermined high-level design. This high level design typically breaks the program into a number of subsystems with each subsystem consisting of a collection of objects. The objects of one subsystem communicate with objects from another subsystem by sending and receiving messages. When messages are sent and received between objects of different subsystems being developed by different groups, an interface is formed between the two subsystems. The integrity of the high level design, depends upon maintenance of these interfaces.

SUMMARY OF THE INVENTION

Accordingly, a need has arisen for a system and method that will facilitate maintaining the integrity of the high level design of an object-oriented software program. The system and method according to the present invention facilitate maintaining the integrity of the high-level design by producing an object summary. In the context of this specification, an object summary refers to a collection of information that enables tracking of the interactions between and among the various objects present in an object-oriented software program.

According to an embodiment of the present invention, there is provided a system for generating an object summary for an object-oriented software program that includes a means for inputting information associated with objects of the object-oriented software program. Object information defining a set of objects used in the object-oriented software program is determined from the inputted information. Interaction information indicating communication between the objects of said set of objects used in the object-oriented software program is also determined from the inputted information. An object summary is generated from the object information and the interaction information. The object summary includes an object summary matrix indicating which objects of the set of objects interact. The object summary can then be displayed for analysis.

The preferred embodiments of the present invention provide various technical advantages. For example, the present invention enables the interactions between and among the various objects used in an object-oriented software program to be summarized. This summary, in turn, provides software architects with a convenient means to verify the integrity of the high level design of a software program. Other features and aspects of the present invention will be apparent from the drawings and detailed description of the invention.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIGS. 3A–B depict a tabular input that may be used in conjunction with the method and system for summarizing object interactions in a software program according to one embodiment of the present invention.

FIGS. 5A–B depict a plurality of message summaries that form a part of an object summary produced by the method and system for summarizing object interactions in a software program according to one embodiment of the present invention.

DETAILED DESCRIPTION OF THE INVENTION

The preferred embodiments of the present invention provide a method and system for developing a summary of the interactions between and among the various objects used in an object-oriented software program. Such a summary advantageously enables software architects to verify the high-level design of a software program.

Figure 1:
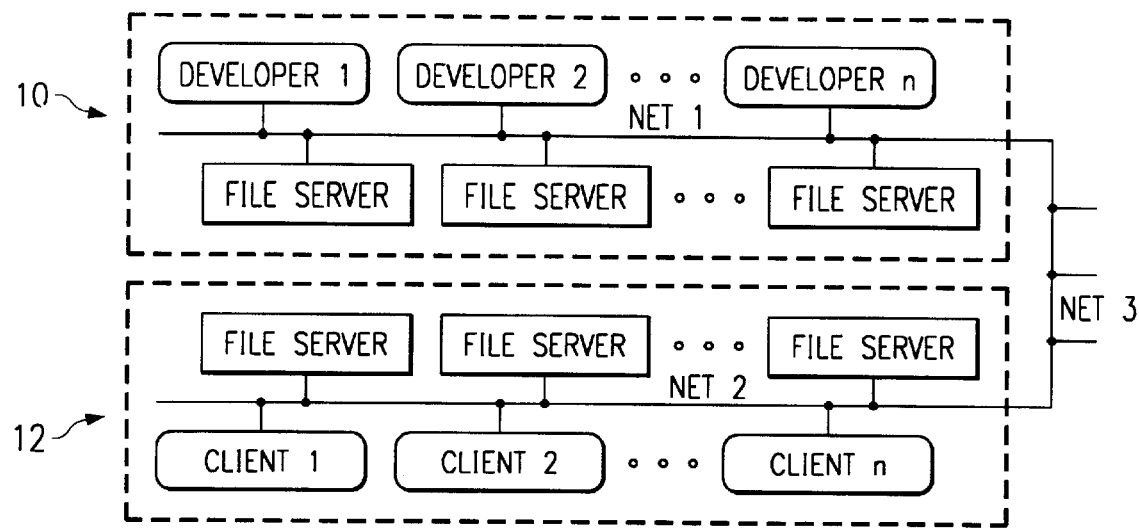
FIG. 1 depicts a computer system within which a method and system for summarizing object interactions in a software program according to one embodiment of the present invention may operate.

FIG. 1 depicts a computer system within which a method and system according to one preferred embodiment of the present invention can operate. FIG. 1 shows a development network 10 comprising n subsystem developers, and n file servers connected via network NET1 which is, for example, a wide area network (WAN) or local area network (LAN). The development network, NET1, is connected to a system network comprising inter alia n clients and n servers connected through NET2 which is, for example, a WAN or LAN. Development network 10 is used, for example, to develop software systems. System network 12 is the network upon which the software systems developed on development network 10 operate. Development network 10 and system network 12 communicate, for instance, via a third network, NET3. NET3 may also comprise, for instance, a wide area or local area network.

The system and method of the present invention typically operate within development network 10. In one embodiment, the system and method of the present invention reside on development file server n so that its inventive features are easily accessible by subsystem developers 1–n. Systems and methods according to preferred embodiments of the present invention are not limited in their operation to computer systems as shown in FIG. 1, but may operate on any suitable computer system. For example, in another embodiment, the system and method of the present invention reside in RAM of a stand alone computer so that its inventive features are accessible to all authorized users of the stand alone computer.

Figure 2:
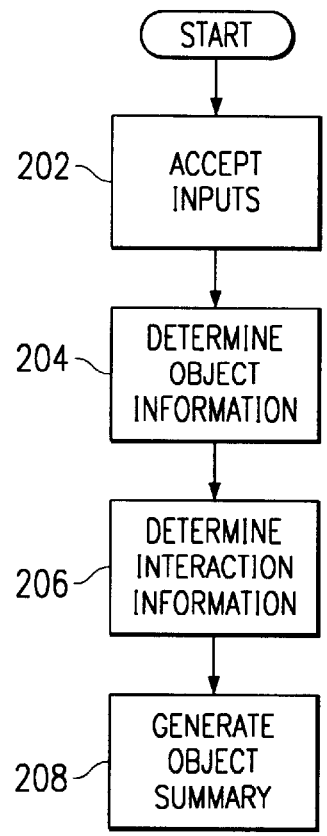
FIG. 2 depicts a flow chart of a method for summarizing object interactions in a software program according to one embodiment of the present invention.

FIG. 2 depicts a flow chart of a method for summarizing object interactions in a software program according to one embodiment of the present invention. In initial step 202, information is input into the system. According to one embodiment, information is input into the method and system using a keyboard and mouse. The input information may take many forms. For example, a single input set comprising all object information and interaction information used in the software program may be used. Alternatively, for larger software programs, a number of input sets may be used, with each input set comprising object information and interaction information about a portion of the software program (e.g., a slice of time in the software program). To simplify explanation, the remainder of the description will be in the context of using a single input set.

In one embodiment, the input set to the system comprises a tabular representation of object and interaction data used in the software program. An example of such a tabular input 300 is shown in FIGS. 3A–B. According to this embodiment of the present invention, standard keyboarding techniques are used to construct tabular input 300 for entry into the method and system of the present invention. In an alternative embodiment, the method and system according to the present invention use optical character recognition technology to enter tabular input 300. Other input methods are contemplated and within the scope of the present invention. Tabular input 300 is also useful for developing graphical use cases in accordance with a related method and system described in copending U.S. patent application Ser. No. 09/177,788. As such, tabular input 300 contains some information that is primarily useful in the development of use cases. Such elements are identified accordingly and briefly explained for completeness.

Tabular input 300 comprises an object definition section 302 and an interaction information section 304. Object definition section 302 comprises information regarding the objects that are present in a software program. More specifically, object definition section 302 defines a set of objects present in the software program. Object definition section 302 defines the framework of the software program to be summarized and includes title row 302a, space line 302b, note row 302c, and class rows 302d. Title row 302a contains a title for the software program. Space line 302b is used to divide title row 302a from the remainder of tabular input 300. Note row 302c is used primarily in developing use cases to display notes in the print outs of use cases. There may be several note rows 302c. Class rows 302d define the objects present in the software program. Class rows 302d comprise an identification field CLASS in the leftmost column of the row and the name of the object in the center column of the row.

Interaction information section 304 is used to define the interactions (i.e., messages) occurring between and among the objects defined in object definition section 302. Interaction information section 304 includes message header rows 304a, a plurality of message rows 304b, and comment section 304c. Message header row 304a indicates that the rows of tabular input 300 that follow contain interaction data. Message rows 304b follow message header row 304a and contain data indicating the messages between objects in the software program. Message rows 304b contain information suitable to define the messages present in the software program. In the center column of message rows 304b, i.e., the FROM column, is an indication of the object that is generating the message. In the rightmost column of message rows 304b, i.e., the TO column, is an indication of the object that is receiving the message. In the leftmost column of the message rows 304b, i.e., the MSG column, is an indication of the interaction between the objects, i.e., the message that is being sent. Comment section 304c is used primarily in the context of developing use cases to create comments to be displayed in the use cases.

Once the information is input into the system, the method of FIG. 2, in step 204, determines object information from the input information. In order for the method and system of the present invention to summarize object interactions in a software program, it first determines the objects that are present in the software program, i.e., the "object information." According to one embodiment, the method of the present invention determines the object information by reading through tabular input 300 and identifying class rows 302d, by for example recognizing the CLASS identifying field of class rows 302d. The object information is then determined from class rows 302d as the information present in the center column of each of class rows 302d.

After determining the object information, the method of FIG. 2 next, in step 206, determines the interaction information. The technical advantages of the method and system of the present invention are derived not only from knowing the objects that are present in a software program. Rather, the technical advantages are derived from knowing the objects and how they communicate, i.e., the "interaction information." According to one embodiment, the method of the present invention determines the interaction information by reading through tabular input 300 and identifying message rows 304b, by for example recognizing the MSG identifier in message header row 304a preceding message rows 304b. The interaction information is then determined by reading all information in message rows 304b.

Figure 4:
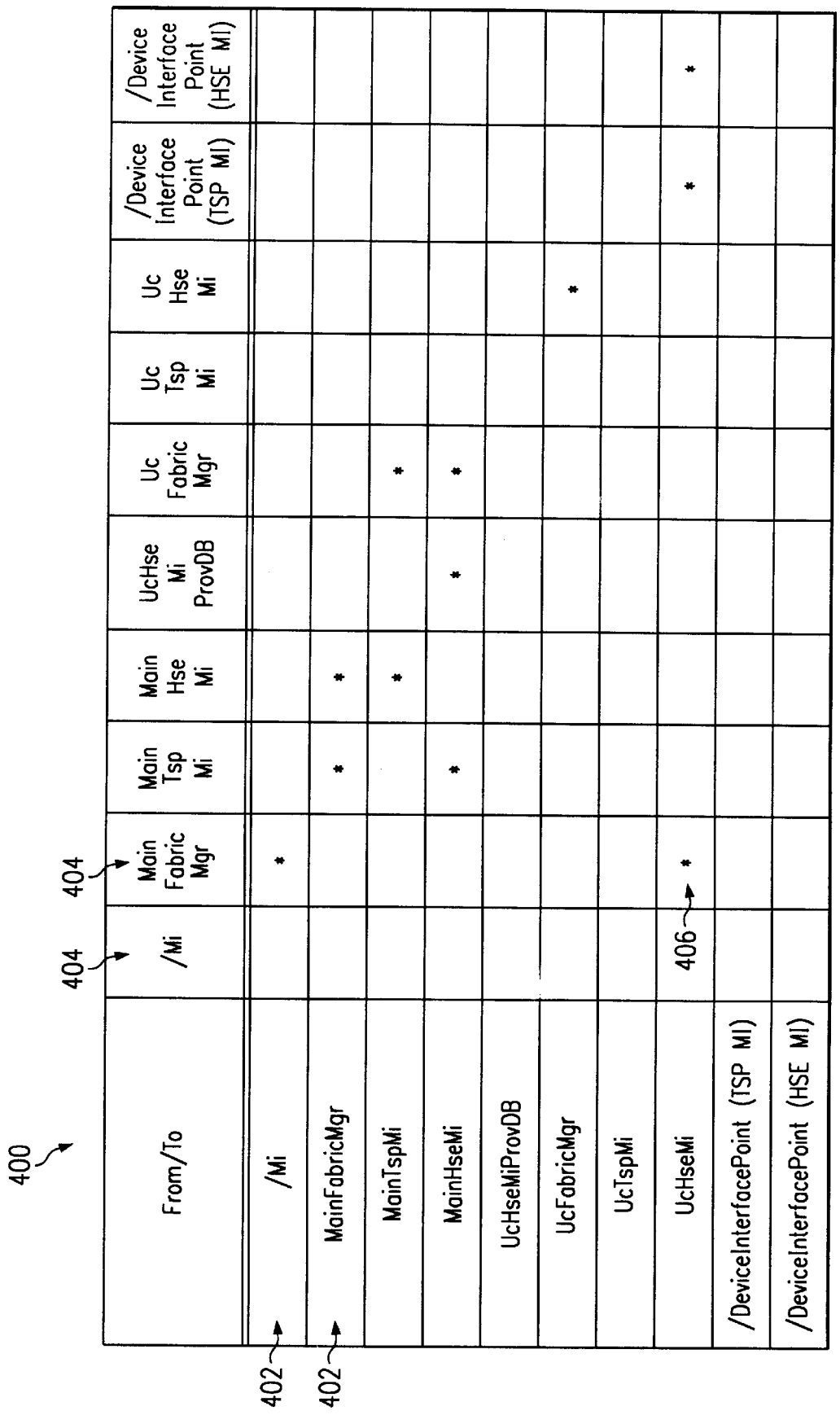
FIG. 4 depicts an object summary matrix produced by the method and system for summarizing object interactions in a software program according to one embodiment of the present invention.

After determining the object information and the interaction information from the input information, the method of FIG. 2 generates an object summary in step 208. According to the preferred embodiments of the present invention, an object summary comprises a presentation of the object information and the interaction information in a format that facilitates verification of the high-level design of a software program. According to one embodiment of the present invention, the object summary comprises an object summary matrix 400 as shown in FIG. 4. Object summary matrix 400 comprises a square matrix having a number of columns and rows equal to the number of objects present in the software program as determined from the object information. As indicated by reference numeral 402 in FIG. 4, each row is labeled with an object name that is determined from the object information. The row labels indicate that a message was sent FROM a particular object present in the software program. Similarly, as indicated by reference numeral 404, each column is also labeled with an object name. The column labels indicate that a message was sent TO a particular object present in the software program.

Object matrix 400 provides an indication of interaction between the various objects using the asterisk symbol (*) as shown, for example at 406. That is, the method and system of the present invention determines and compiles from the interaction information instances of two objects interacting with each other and indicates such interaction between two objects by placing an asterisk in the appropriate cell of object summary matrix 400. For example, the asterisk at 406 indicates that a message was passed FROM the object UcHseMi and TO the object MainFabriMgr.

The object summary may also comprise a plurality of message summaries 502 as shown in FIGS. 5A–B. Whereas object summary matrix 400 provides an indication of communication FROM one object TO another object, a message summary 502 provides a log of all of the messages within the software program that are FROM a particular object and all of the messages within the software program that are sent TO the particular object. FIGS. 5A–B show a message summary for every object defined by tabular input 300 shown in FIGS. 3A–B.

The content of a message summary 502 will be explained with reference to the message summary for the object MainHseMi indicated at 504. Message summary 504 comprises a class line 504a and a message log 504b. Class line 504a indicates the object name for the message summary for identification purposes. Message log 504b indicates all of the messages sent from or received by the object indicated in class line 504a. Each line in message log 504b provides (from left to right) an indication of whether the message is sent "from" or sent "to" the object indicated in class line 504a, an indication of the second object involved in the communication, and the message that is being communicated. Message summary 502 and object summary matrix 400 together provide an overview of the operation of the software program and thereby enables a software architect to verify that the low level design of the software program is consistent with the high level design or architectural constraints of the software program. Object summary matrix 400 and message summary 502 can be printed out or displayed on a monitor of a computer system in accordance with standard techniques.

Although the present invention has been described in detail, it should be understood that various changes, substitutions, and alterations can be made without departing from the intended scope as defined by the appended claims.

What is claimed is:

1. A system for generating an object summary for an object-oriented software program comprising:
   means for inputting information associated with objects of the object-oriented software program;
   means for determining from said information, object information defining a set of objects used in the object-oriented software program;
   means for determining from said information, interaction information indicating communication between the objects of the set of objects used in the object-oriented software program;
   means for generating the object summary from the object information and the interaction information, said object summary including an object summary matrix indicating which objects of the set of objects interact; and,
   means for displaying the object summary.

2. The system of claim 1 wherein said object summary further comprises a plurality of message summaries, one of said message summaries comprising a list of messages sent from and sent to an object.

3. The system of claim 1 wherein said object summary further comprises a plurality of message summaries, one message summary for every object of the set of objects, one of said message summaries comprising a list of messages sent from and sent to an object.

4. The system of claim 1 wherein the object summary matrix comprises a square matrix having a row for each object and a column for each object, said matrix providing an indicator of communication between a first object and a second object in a cell, said cell defined by a row corresponding to said first object and a column corresponding to said second object.

5. The system of claim 1 wherein said means for inputting comprises means for inputting a table of information associated with said set of objects used in the object-oriented software program.

6. The system of claim 1 wherein said means for inputting comprises means for inputting a plurality of tables representative of respective portions of the object-oriented software program and wherein one of said tables comprises information associated with a group of objects present in one of said portion.

7. The system of claim 1 wherein the means for determining interaction information determines, for a first object of said set of objects, other objects of said set of objects the first object communicates with.

8. The system of claim 1 wherein said set of objects comprises every object used in the object-oriented software program.

9. The method of claim 8 wherein the object summary matrix comprises a square matrix having a row for each object and a column for each object, said matrix providing an indicator of communication between a first object and a second object in a cell, said cell defined by a row corresponding to said first object and a column corresponding to said second object.

10. A method for generating an object summary of an object-oriented software program comprising:
    inputting information associated with objects of the object-oriented software program;
    determining from said information, object information defining a set of objects used in the object-oriented software program;
    determining from said information, interaction information indicating communication between the objects of said set of objects used in the object-oriented software program;
    generating the object summary from the object information and the interaction information, said object summary comprising an object summary matrix indicating which objects of the set of objects interact; and,
    displaying the object summary.

11. The method of claim 10 wherein said object summary further comprises a plurality of message summaries, one of said message summaries comprising a list of messages sent from and sent to an object.

12. The method of claim 10 wherein said object summary further comprises a plurality of message summaries, one message summary for every object of the set of objects, one of said message summaries comprising a list of messages sent from and sent to an object.

13. The method of claim 10 wherein said inputting comprises inputting a table of information associated with said set of objects used in the object-oriented software program.

14. The method of claim 10 wherein said inputting comprises inputting a plurality of tables representative of respective portions of the object-oriented software program and wherein one of said tables comprises information associated with a group of objects present in one of said portion.

15. The method of claim 10 wherein the means for determining interaction information determines for a first object of said set of objects, other objects of said set of objects the first object communicates with.

16. The system of claim 10 wherein said set of objects comprises every object used in the object-oriented software program.

* * * * *